April 23, 1968  E. A. BOCCONE  3,379,398
TABLE AND LEG ASSEMBLY DEVICE
Filed Aug. 12, 1966  2 Sheets-Sheet 2
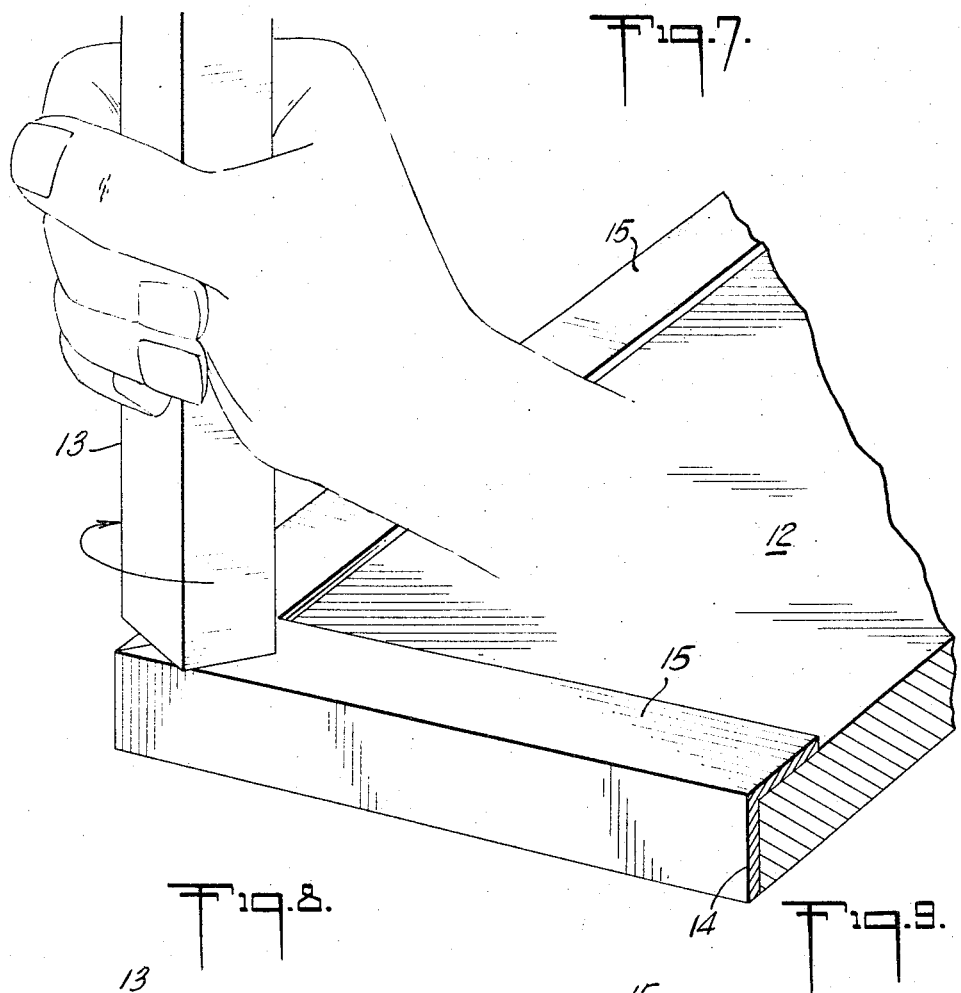
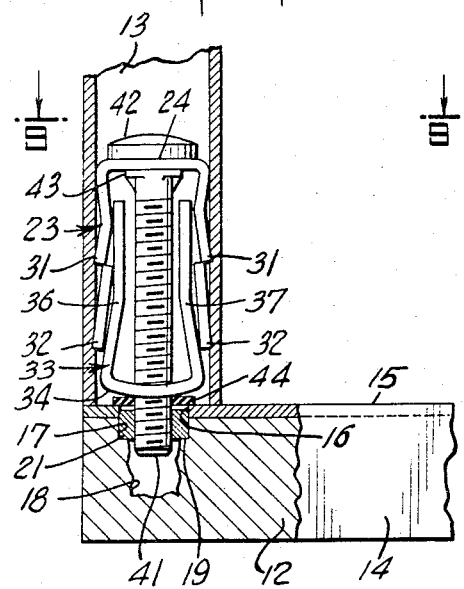
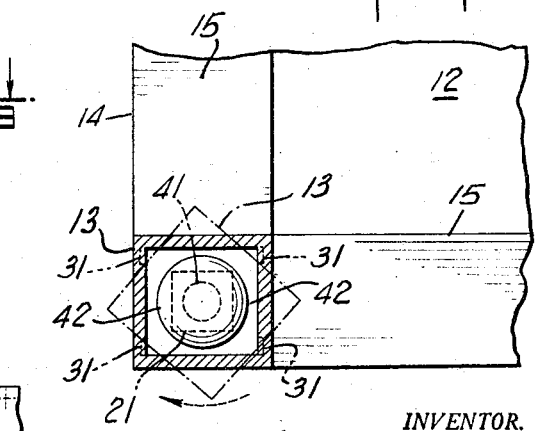
INVENTOR.
EGIDIO A. BOCCONE
BY
ATTORNEY 3,379,398
TABLE AND LEG ASSEMBLY DEVICE
Egido A. Boccone, Strong's Neck,
Setauket, N.Y. 11785
Filed Aug. 12, 1966, Ser. No. 572,124
9 Claims. (Cl. 248—188)

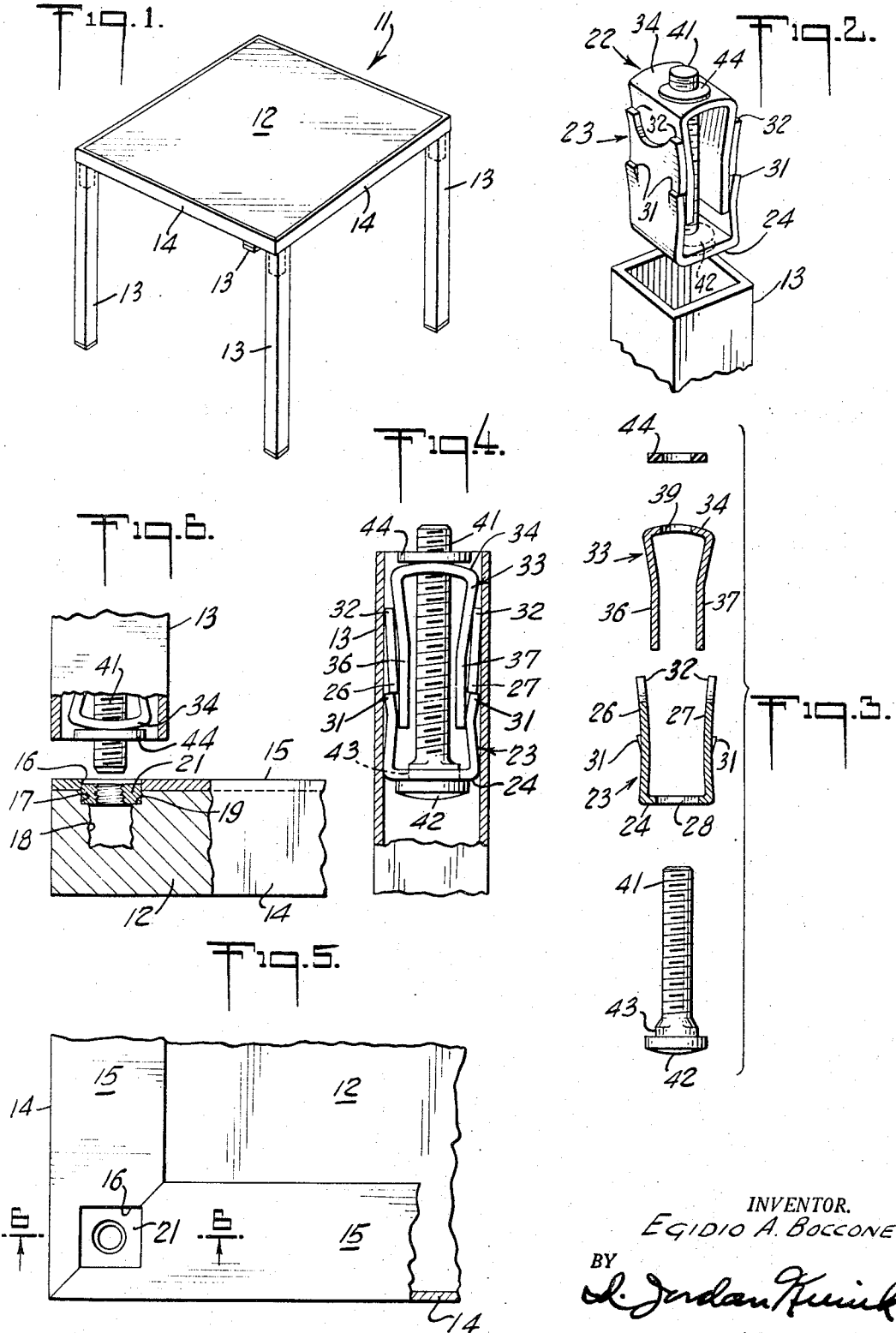

ABSTRACT OF THE DISCLOSURE

A device for joining a tubular leg to a table comprising a stationary threaded nut in the table and an expansion bolt assembly in the interior of the attaching end of the table leg. The expansion bolt assembly includes a threaded draw bolt, a wedge clip and a spur clip with the draw bolt non-rotatably secured to the spur clip. The expansion bolt assembly is rotatable with the table leg so that threaded engagement of the draw bolt with the nut causes the clips to become increasingly wedged and secured in the table leg and brings about the firm and rigid mounting of the leg to the table.

---

This invention relates to furniture stored and sold in unassembled form with the purchaser being required to assemble the parts to construct the finished product. More particularly, the invention is directed to the provision of a novel expansion bolt cooperating with both a table leg and table top for securing the parts firmly and rigidly together without the exercise of any appreciable skill on the part of the purchaser.

The invention comprises an expansion bolt which consists of a wedge clip and spur clip assembly which is inserted into a tubular table leg and which engages the table top in a manner whereby the simple operation of turning the table leg brings about the firm and rigid mounting of the leg upon the table.

A feature of the invention is the provision of spurs on the spur clip which is made of a hard material being increasingly urged and embedded into the somewhat softer material of the interior walls of the table leg as the latter is being turned into position relative the table top whereby a rigid assembly is achieved between the parts. A wedge clip is telescopically operative upon the spur clip while a draw bolt mounted fast on the spur clip extends movably through the wedge clip and threadably into a recessed bore in the bottom of the table top.

As will be described hereinafter, the particular arrangement and construction of the component parts of the table gives the unskilled purchaser considerable facility in properly attaching the legs to the table top in a manner that ensures a strong and stable structure. Also, the purchaser is able to align the sides of the table legs with corresponding edges of the table top without error so that an attractive, finished product, is achieved.

Although the invention is illustrated and described herein in conjunction with rectangular top tables, it is understood that the invention is applicable also to tables having round, oval, or free-form tops.

Still other objects and advantages of the invention will be apparent from the specification.

The features of novelty which are believed to be characteristic of the invention are set forth herein and will best be understood, both as to their fundamental principles and as to their particular embodiments, by reference to the specification and accompanying drawings, in which:

FIGURE 1 is a perspective view of a table, each leg of which is connected thereto by means of the expansion bolt of the present invention;

FIGURE 2 is an enlarged perspective exploded view of a fragmentary portion of a table leg and the expansion bolt assembly of the present invention;

FIGURE 3 is an exploded side view of the expansion bolt assembly shown in FIGURE 2;

FIGURE 4 is a somewhat further enlarged side view of the expansion bolt assembled in position within a portion of the table leg, shown partly in section;

FIGURE 5 is an enlarged fragmentary view of the bottom of the table showing the nut to which the bolt is secured and its location;

FIGURE 6 is a fragmentary exploded view taken on line 6—6 of FIGURE 5, of a portion of the table, of the table leg, and of the expansion bolt, some parts being shown in section and other parts being broken away;

FIGURE 7 is a greatly enlarged view of a fragmentary portion of the bottom of the table showing the manner in which the table leg is turned into position;

FIGURE 8 is a fragmentary view of the table and the leg showing the manner in which the expansion bolt is located in its locking position, some parts being shown in section; and FIGURE 9 is a view taken on line 9—9 of FIGURE 8, some parts being omitted, some parts in section, and some parts in elevation, the table leg also being shown in dotted outline during rotation on its axis as indicated in FIGURE 7.

Referring now to the drawings in detail, the present invention is directed to the construction of a table or the like, generally designated 11, as shown in FIGURE 1, wherein said table comprises a table top 12 and four legs 13 secured at each of the corners thereof. Legs 13 are fabricated of sheet metal or other suitable stiff material in the form of suitable tubular structures, said tubes being rectangular in the embodiment shown in the drawings.

In some embodiments, table top 12 may be made of a suitable material such as wood, plastic, formica, fiberboard, or the like, and may be bounded at its periphery by a band 14 of sheet metal on each of the vertical side edges thereof, the metal band having a flange 15 extending inwardly a short distance along the bottom surface of said table as shown in FIGURE 5, for example.

In each of the four corners of the bottom surface of table top 12, where flange 15 forms a mitered joint, said flange has a square aperture 16 with which are aligned a first bore 17 and a second smaller bore 18 in said table top. A shoulder 19 at the juncture between bores 17 and 18 supports threaded square nut 21 which is prevented from rotating by and is fixed firmly in position within recess 16 and bore 17. See FIGURES 5 and 6.

The device for securing each leg 13 to table top 12 consists of an expansion bolt assembly, generally designated 22, comprising spur clip 23 made of metal and having a base 24 and a pair of integrally formed spaced apart wings 26 and 27 extending generally perpendicularly from said base and curving slightly outwardly from each other. Base 24 has an aperture 28 while wings 26 and 27 each have two spaced apart pairs of integrally formed and outwardly extending spurs 31 and 32, respectively. See FIGURES 2, 3, 4 and 8.

A wedge clip 33 adapted to cooperate with spur clip 23 comprises base 34, and a pair of integrally formed spaced apart curved wings 36 and 37 extending generally perpendicularly from said base and curving slightly inwardly toward each other. Base 34 also has an aperture 39 which is axially aligned with aperture 28 in spur clip 23 when said clips are telescoped together.

A threaded draw bolt 41 extends through aparture 28 of base 24 of spur clip 23 to the limit established by bolt head 42 bearing against the outside surface of base 24. Bolt 41 is secured fast in spur clip 23 by swinging stub 43 of said bolt at several locations against the interior surface of base 24 whereby said bolt is prevented from rotating relative to said spur clip. The free end of the shaft portion of draw bolt 41 extends through aperture 39 of wedge clip 33 when the latter is telescoped in a mating conjunction with spur clip 23 as shown in FIGURES 2 and 4, for example. Aperture 39 of wedge clip 33 is somewhat wider in diameter than the diameter of draw bolt 41 whereby said wedge clip may freely move longitudinally relative to said draw bolt.

Mounted around and near the free end of draw bolt 41 is a washer 44 made of resilient material such as rubber, neoprene, or the like. One of the functions of washer 44 is to cause wedge clip 33 to assume a loose telescoped cooperation with spur clip 23 whereby said spur clip and said wedge clip may be transported in semi-assembled condition prior to its insertion in the table leg when the latter is to be attached to the table top. In some embodiments, washer 44 may be omitted.

When it is desired to attach a table leg 13 to table top 12, the loose assembly of draw bolt 41, wedge clip 33, and spur clip 23, together with washer 44, is inserted into the hollow aperture of table leg 13, with wings 36 and 37 of the wedge clip being in contiguous relationship with the inner surfaces of wings 26 and 27, respectively, of spur clip 23. See FIGURE 4. The dimensions of spur clip 23 are such that the expansion bolt assembly fits snugly into the interior of the end of table leg 13 while washer 44 prevents the spur clip and wedge clip from becoming temporarily disassembled if by any chance the fit is not as snug as may be desired. The expansion bolt assembly 22 is inserted into the interior of the table leg in such a maner that the free end of draw bolt 41 extends upwardly above the top end of table leg 13 as shown in FIGURE 4.

In order to attach a table leg 13 to table top 12, the latter is set on a suitable flat surface with is bottom surface extending upwardly as shown in FIGURES 6 and 7. Table leg 13 is grasped and the free end of draw bolt 41 is threadably inserted into nut 21, and by rotating leg 13 on its axis, said draw bolt is drawn into said nut. As table leg 13 is continued to be rotated, bolt 41 extends further into nut 21 even while the upper edge of the table leg abuts against flange 15 of band 14. Upon further rotation of draw bolt 41, wings 26 and 27 of spur clip 23 are drawn over wings 36 and 37 of wedge clip 33 whereby wings 26 and 27 are caused to spread apart due to the curvature of wings 36 and 37. Thus, spurs 31 and 32 become increasingly embedded into the interior surfaces of the walls of table leg 13, as shown in FIGURE 8, thereby securing the table leg firmly to the table top.

Since there is no definitive stopping point for the threadable engagement of draw bolt 41 with nut 21, because of bore 18, table leg 13 can be continued to be rotated until the rectangular corner of said table leg is aligned evenly with the rectangular corner of the table top as shown in FIGURES 1 and 9. It has been found that some resilience is supplied by washer 44 to permit a modicum of movement of the expansion bolt assembly while, at the same time, the rotation of the table leg is permitted for the fine adjustment of alignment thereof with the corner of the table top.

By providing that the metal or material of table leg 13 is softer than the material of spur clip 23, there is no definitive limitation to the tightening of said leg relative to the table top when the leg is being turned to a position where its sides may be aligned with the edges of the table top. Thus, the table leg 13 may be made of extruded aluminum or comparably soft alloy, while spur clip 23 is made of a somewhat harder and tougher metal such as steel, steel alloy, or the like.

While table leg 13 is being turned into position, spur clip 23 is drawn toward the end of the table leg. When base 34 of wedge clip 33 abuts directly against flange 15 (when washer 44 is omitted), or abuts washer 44 which lies against said flange, said wedge clip becomes immobile, whereby spur clip wings 26 and 27 are spread apart as they slide along wedge clip wings 36 and 37. By this operation, spurs 31 and 32 become increasingly embedded in the respective adjacent interior walls of table leg 13 thereby enhancing the rigidity with which said leg is secured to the table top.

If, by chance, the table leg is not fully secured to the table top when the top of the leg abuts flange 15 and it sides are aligned with the table sides, it is necessary only to give the table leg successive quarter turns until the desired rigidity or firmness is achieved. Thus, the element of skill and chance for realizing a proper appearing and sturdy assembly of table and legs is virtually eliminated, thus enabling the unskilled, or even an inept housewife, to assemble the parts with as satisfactory results as may be achieved by the trained artisan. Since the table legs will be prefabricated of every length, the stability of the assembled table is assured.

While the invention has been illustrated and described hereinbefore as useful in joining legs to tables or table tops, it is to be understood that the same novel devices and mechanisms can be employed in joining legs to other types of furniture such as stools, bookcases, cabinets, and the like. Where the term "table" is used in the specification and claims herein, it is contemplated that said term comprehends all forms of furniture and appliances to which legs may be attached.

The foregoing detailed description has been given for clearness of understanding only and no unnecessary limitations are to be understood therefrom. The invention is not limited to the exact details shown and described for obvious modifications will occur to those skilled in the art.

What is claimed is:

1. An assembly device for joining a tubular table leg to a table or the like comprising an expansion bolt assembly, including the following components:
    (a) a U-shaped spur clip;
    (b) a U-shaped wedge clip telescopically movable within said spur clip;
    (c) a pair of spaced apart wings on said spur clip;
    (d) at least one spur on each of said wings;
    (e) a draw bolt mounted fast on the base of said spur clip, said draw bolt being movable freely through said wedge clip;
    (f) a stationary nut in the bottom of said table;
    (g) a recessed bore in said table top axially aligned with said nut, said nut being engageable threadably by the free end of said draw bolt;
    (h) said assembly of said spur clip, wedge clip and draw bolt being insertable into position within the interior of one end of said table leg;
    (i) said draw bolt being threadably engageable with said nut causing said draw bolt to urge said wedge clip into said spur clip and consequently to cause said spurs to become embedded into the interior walls of said table leg.

2. An assembly device according to claim 1 and further comprising a resilient washer positioned around said expansion bolt and located between the base of said wedge clip and said nut.

3. A device according to claim 1 wherein said spur clip and said wedge clip each comprise a base and two spaced apart integrally formed wings, the wings of said wedge clip extending between the wings of said spur clip, the wings of said wedge clip being curved in a manner to urge the wings of said spur clip to become spaced further apart from each other when said draw bolt is continually threaded into said nut.

4. A device according to claim 2 wherein the inside diameter of said washer is slightly less than the outside diameter of said draw bolt whereby said wedge clip and said spur clip are maintained in a loose assembly relative to each other.

5. A device according to claim 1 and further comprising a metal flange on the bottom of said table top, said flange surrounding said nut and forming a surface against which the end of said table leg abuts while the latter is rotated to cause said bolt threadably to engage said nut.

6. A device according to claim 1 wherein said spurs are made of a material considerably harder than the material of said table leg whereby said spurs become embedded in the interior walls of said table leg when said wedge clip is urged telescopically into said spur clip.

7. A device for joining a tubular leg to a table or the like comprising a stationary threaded nut in said table, an expansion bolt assembly located in the interior of one end of said table leg, a threaded draw bolt in said expansion bolt assembly, said draw bolt being axially rotatable with said table leg, said draw bolt threadedly engaging said nut when said leg is rotated, the continued rotation of said leg and the continued threadable engagement of said draw bolt with said nut causing said expansion bolt assembly to become increasingly wedged and secured into said table leg, and wherein said draw bolt assembly comprises a spur clip, and a wedge clip telescopically movable within said spur clip, said draw bolt being mounted fast on said wedge clip, the increasing threadable engagement of said draw bolt with said nut causing said wedge clip to urge said spur clip into increasingly secure engagement with said table leg.

8. A device according to claim 7 and further comprising a plurality of spurs on said spur clip, said spurs being made of a material harder than that of said table leg, said spurs becoming increasingly embedded in the interior walls of said table leg as said leg is rotated relative to said nut.

9. A device according to claim 8, and further comprising an abutment on said table surrounding said nut, the end of said table leg being rotatable against said abutment while said draw bolt becomes increasingly threaded into said nut and said expansion bolt assembly becomes increasingly wedged within said table leg.

References Cited
UNITED STATES PATENTS

| | | | |
|---|---|---|---|
| 2,034,051 | 3/1936 | Lipp | 287—124 |
| 2,698,775 | 1/1955 | Courtwright | 287—20 |

ROY D. FRAZIER, *Primary Examiner.*

FRANK DOMOTOR, *Assistant Examiner.*